(12) United States Patent
Bienek et al.

(10) Patent No.: US 7,826,577 B2
(45) Date of Patent: Nov. 2, 2010

(54) METHOD FOR FREQUENCY ACQUISITION OF A MOBILE COMMUNICATIONS DEVICE

(75) Inventors: Bernd Bienek, Bocholt (DE); Andreas Falkenberg, Escondido, CA (US); Stephan Karger, Hamminkeln (DE); Theo Kreul, Coesfeld-Lette (DE); Albrecht Kunz, Saarbrücken (DE); Holger Landenberger, Bocholt (DE)

(73) Assignee: Palm, Inc., Sunnyvale, CA (US)

( * ) Notice: Subject to any disclaimer, the term of this patent is extended or adjusted under 35 U.S.C. 154(b) by 1202 days.

(21) Appl. No.: 10/381,149

(22) PCT Filed: Sep. 19, 2001

(86) PCT No.: PCT/DE01/03612

§ 371 (c)(1),
(2), (4) Date: Aug. 19, 2003

(87) PCT Pub. No.: WO02/25881

PCT Pub. Date: Mar. 28, 2002

(65) Prior Publication Data

US 2004/0028160 A1 Feb. 12, 2004

(30) Foreign Application Priority Data

Sep. 20, 2000 (DE) ................................ 100 46 575

(51) Int. Cl.
*H04L 7/00* (2006.01)

(52) U.S. Cl. .................. 375/354; 375/136; 375/142; 375/143; 375/144; 375/145; 375/147; 375/148; 375/149; 375/150; 375/316; 375/365; 375/366; 375/367; 375/368

(58) Field of Classification Search ................ 375/354, 375/360, 362, 365–370, 142–145, 316, 324, 375/339, 136, 147–150; 327/141; 370/503; 709/248; 714/12; 455/71, 434, 179.1, 180.1, 455/182.1, 184.1, 185.1, 186.1
See application file for complete search history.

(56) References Cited

U.S. PATENT DOCUMENTS 5,909,433 A * 6/1999 Haartsen ..................... 370/337

(Continued)

FOREIGN PATENT DOCUMENTS

DE 694 14 561 4/1999

(Continued)

OTHER PUBLICATIONS

Peter Smolka, "GSM-Funkschnittstelle, Elemente and Funktionen", telekom praxis Heft 4, 1'993, pp. 17-24.

*Primary Examiner*—Mohammad H Ghayour
*Assistant Examiner*—Sophia Vlahos
(74) *Attorney, Agent, or Firm*—K&L Gates LLP

(57) ABSTRACT

A method is provided for frequency acquisition, particularly for initial frequency acquisition, pursuant to a known synchronization sequence for synchronizing a mobile communications device having a local oscillator with previously known transmit frequencies of a base station that transmit in a known channel raster with defined frequency points within a band, wherein the method includes the steps of determining the inband power of the known synchronization sequence via a sensor by scanning a frequency band, performing coarse determination of the local power maximum of the inband power and, thus, of the received carrier frequency over the scanned frequency band, producing a presumed channel frequency at which the base station is transmitting on the basis of knowledge of the channel raster of the transmit frequencies of the base station, performing fine determination of the received carrier frequency by comparison with the known synchronization sequence, and correcting the frequency deviation of the local oscillator from the transmitted carrier frequency.

5 Claims, 3 Drawing Sheets

U.S. PATENT DOCUMENTS

| | | | |
|---|---|---|---|
| 5,953,323 A * | 9/1999 | Haartsen | 370/330 |
| 6,597,729 B1 * | 7/2003 | Schmidl et al. | 375/149 |
| 6,615,043 B1 * | 9/2003 | van de Berg | 455/434 |
| 6,618,452 B1 * | 9/2003 | Huber et al. | 375/343 |
| 6,625,200 B1 * | 9/2003 | Dent | 375/142 |
| 6,647,066 B1 * | 11/2003 | Szajnowski | 375/260 |
| 6,678,336 B1 * | 1/2004 | Katoh et al. | 375/316 |
| 6,680,920 B1 * | 1/2004 | Wan | 370/311 |
| 6,950,455 B2 * | 9/2005 | Tanno et al. | 375/142 |
| 2002/0136180 A1 * | 9/2002 | Asokan | 370/337 |
| 2004/0024588 A1 * | 2/2004 | Watson et al. | 704/200.1 |
| 2004/0058679 A1 * | 3/2004 | Dillinger et al. | 455/439 |
| 2004/0190645 A1 * | 9/2004 | Critchlow et al. | 375/316 |

FOREIGN PATENT DOCUMENTS

| | | |
|---|---|---|
| DE | 198 56 401 | 6/2000 |
| EP | 0 526 833 | 2/1993 |
| EP | 0 789 466 | 8/1997 |
| WO | WO0225881 A1 * | 3/2002 |

* cited by examiner

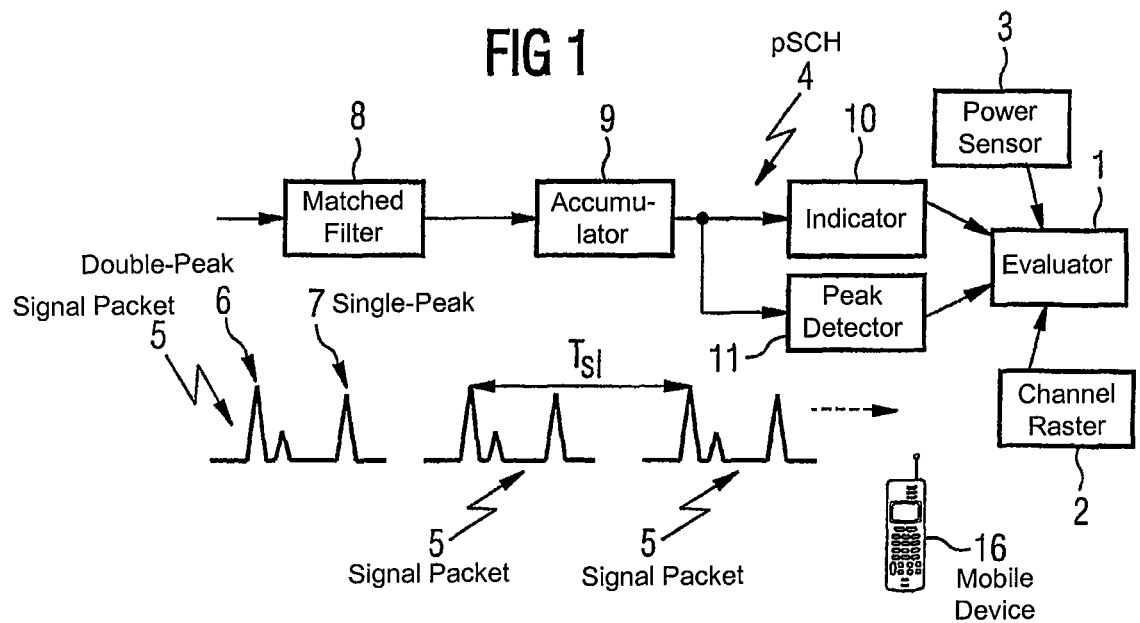
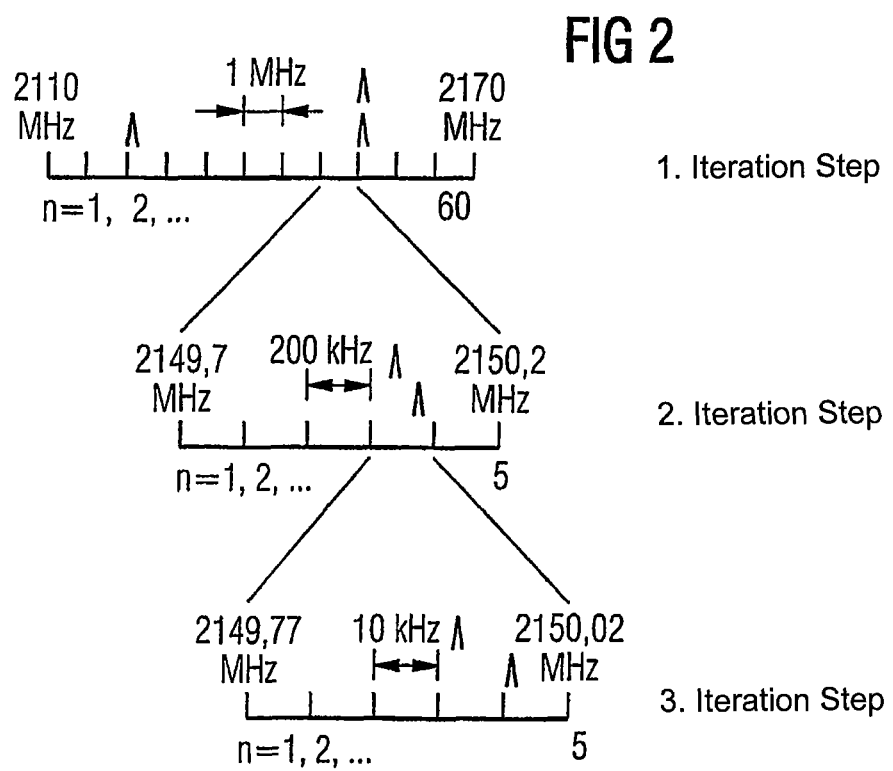

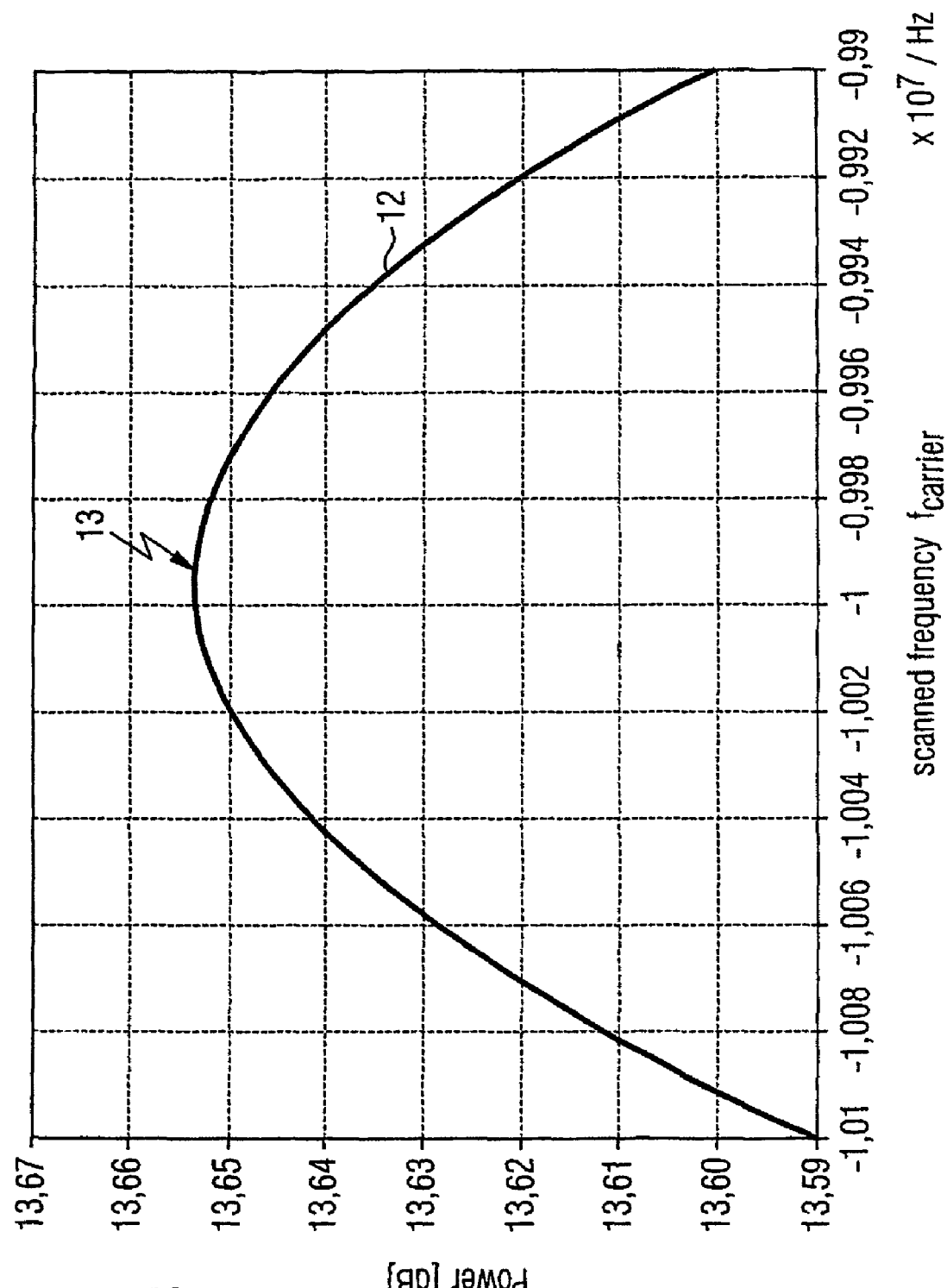

METHOD FOR FREQUENCY ACQUISITION OF A MOBILE COMMUNICATIONS DEVICE

The present invention relates, generally, to a method for frequency acquisition and, more particularly, to a method for initial frequency acquisition via a known synchronization sequence for synchronizing a mobile communications device having a local oscillator with the previously known transmit frequencies of a base station that transmit in a known channel raster with defined frequency points.

In mobile communications devices, a standard for mobile communication makes available a synchronization sequence known throughout the network. In addition, the transmit frequency of the base station is known with a sufficiently high accuracy specified by the standardization bodies. This accuracy is currently 0.05 ppm in the UMTS Standard. The channel raster in which the base station transmits is known in this case a priori to the mobile station. In the case of a UMTS mobile radio network, the raster includes channels at a spacing of 200 kHz at defined frequency points. By contrast, it is not known which channel is currently being used by the base station, nor which frequency drift the oscillator of the mobile receiving station has. The manufacturing tolerances and temperature spreads, as well as other possible external influences result in a frequency inaccuracy of the local oscillator which is typically +/−25 ppm. The frequency inaccuracy is mostly still above this value when use is made of cost-effective local oscillators (LO). Such a large inaccuracy is disadvantageous, since this leads to a complicated and lengthy synchronization of the mobile part with the base station. This problem has so far been solved by calibrating the mobile parts of the communications device during fabrication, thus lowering the frequency drift of the local oscillator to approximately +/−3 ppm. However, this is very time-consuming and cost-intensive.

Moreover, it has been proposed, for the purpose of initial autocalibration when first switching on the mobile part, given a frequency inaccuracy of, however, +/−25 ppm, to make use of an algorithm in the case of which a carrier, modulated with the aid of an SCH channel (synchronization channel) of the base station, is scanned by an SCH correlator accompanied by variation of the receive frequency. In this case, use has so far been made as SCH correlator only of a single so-called matched filter, which is matched to the synchronization frequency of the primary SCH channel, which is denoted from now on as SCH channel, for short. After initial autocalibration has been performed, a frequency accuracy of +/−3 ppm can be assumed in the synchronization operations following thereupon. Since the correlation bandwidth for the codes used is small according to specification—(on the order of magnitude of 10-20 kHz) by comparison with the scanning range, whereas the scanned frequency band can include the complete UMTS bandwidth of 60 Mhz, this method is very time-consuming and costly. Step sizes smaller than 14 kHz must be used in this case for correlation. This step size can be obtained from simulation results. The initial frequency acquisition requires 6000 steps for a step width used of 10 kHz, for example.

It is, therefore, an object of the present invention to make available a method via which a frequency acquisition in the mobile part of a mobile communications device can be accelerated.

SUMMARY OF THE INVENTION

The basic idea of the present invention consists in determining the inband power via a sensor in parallel with the conventional SCH correlation which is used, as previously, as an integral constituent of the newly developed method. The presumed channel frequency at which the base station is transmitting is deduced from the determination of the local power maximum over the entire scanned frequency band. The channel spacing, known a priori, of the possible discrete channel frequencies is used for this purpose in a supplementary way. The channel spacing between the frequency points is 200 kHz in the case of a UMTS mobile radio network. Moreover, the transmit frequency of the base station is known with a sufficiently high accuracy, specified by the standardization bodies, of +/−0.05 ppm. Given a maximum frequency of 2.17 GHz, the result is a maximum uncertainty of approximately 20 Hz with reference to the signal transmitted by the base station. This high accuracy is achieved by GPS, or DVF77 signals. It is thereby possible for the channel frequencies emitted by the base station to be used as differential signals for tuning the local oscillator of the mobile station. This is attended by the advantage that the synchronization is performed substantially faster, which leads to a greatly reduced power consumption in the mobile part. As such, the standby times of the mobile part can be significantly increased.

It is preferred to apply the method according to the present invention upon the first startup and/or each further xth startup of the mobile communications device. Aging effects and temperature deviations of the components that are used to generate frequency are thereby automatically recalibrated. Since this takes place automatically during callup, no additional outlay is caused. By contrast, calibration via the temperature during fabrication would be time-consuming and cost-intensive. Moreover, the communications device can be matched adaptively to the user's surroundings in the case of the method described. Again, this method leads to an increase in the product service life owing to the recalibration rendered possible. The determination of the dummy x is a function of a number of factors; for example, the temperature fluctuations in the surroundings of the oscillator, and the age of the latter. The value can be 1, such that a recalibration is performed with each synchronization, or else, for example, 2, 10, etc. The larger the value of x, the less is the power consumption, and longer standby times of the mobile part can be achieved.

It is preferred, furthermore, when the accurately determined frequency of the local oscillator is adopted after the synchronization as reference by storing the determined hardware calibration parameters in a memory of the mobile communications device. It is possible as a result to undertake a first calibration of the local oscillator in the RF section of the mobile station. That is to say, the algorithm in this case automatically adopts the settings for calibrating the local oscillator which otherwise would have to be undertaken during the production process.

In particular, this method can be applied in the case of a UMTS mobile radio network, the determination of the inband power being performed by a power sensor, and the fine determination of the received carrier frequency being performed by an SCH correlator.

One embodiment of the present invention provides for synchronizing the mobile communications device with a first base station and carrying out the callup to this base station, but a switch is made to a second base station during the call. This is advantageous whenever it emerges during a call that another base station is being received more strongly than the base station with which synchronization was originally carried out. Consequently, by comparison with the known method, a higher level of reliability and of frequency accuracy is achieved than in the case of a conventional method in which only an SCH correlator is used. The reason for this is that the results are confirmed independently of one another simultaneously by the SCH correlator and the power sensor. As such, in the case of a UMTS mobile radio network, each of the possible channels of this network can be used for synchronization. For example, it is possible to perform synchronization with channel 2 of a base station of a first operating company; the actual callup taking place, however, subsequently on channel 5 of another base station of a second operating company. This is possible because the UMTS base stations are transmitting at approximately the same frequency, the difference between them being only +/−1 ppm.

Additional features and advantages of the present invention are described in, and will be apparent from, the following Detailed Description of the Invention and the Figures.

BRIEF DESCRIPTION OF THE FIGURES

FIG. 1 shows a schematic of the cycle of an exemplary embodiment according to the present invention.

FIG. 2 shows the frequency bands to be scanned for the individual steps during the method according to FIG. 1.

FIG. 3 shows a measuring instrument of a power sensor over a frequency profile.

DETAILED DESCRIPTION OF THE INVENTION

Figure 4:
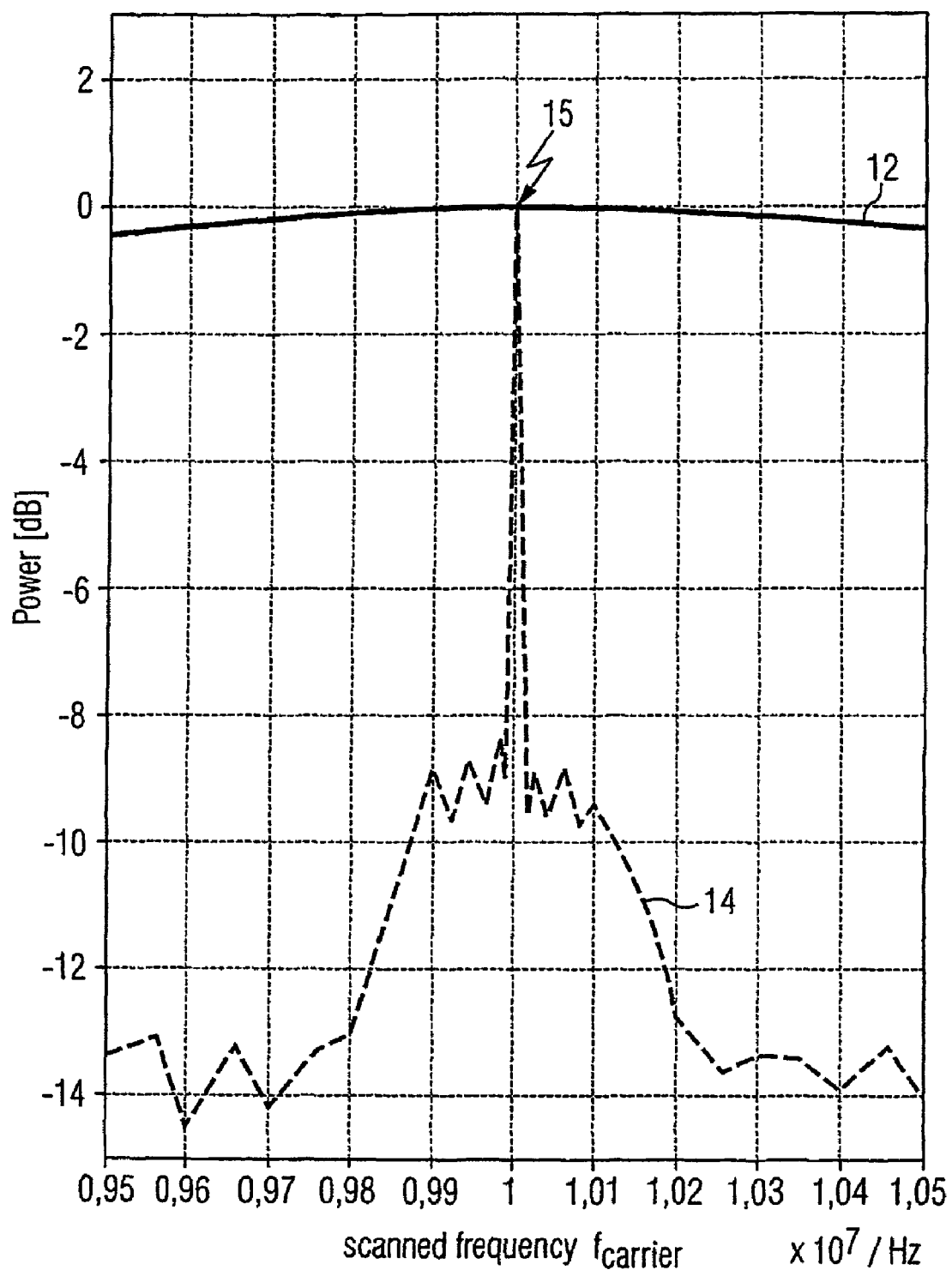
FIG. 4 shows the measurement result of FIG. 3, combined with the measurement result of a pSCH correlator over a frequency band.

Specified in FIG. 1 are the individual groups of information that flow together in an evaluator 1 and from which the frequency acquisition can be undertaken. Firstly, the a-priori knowledge 2 about the channel raster of the base station flows into the evaluation, as does the result, measured with the aid of a power sensor 3, of the inband power over a frequency band, as illustrated in FIG. 3. Also flowing in is the information that is obtained via a primary synchronization channel (pSCH) 4, as illustrated in FIG. 4. Signal packets 5 are transmitted slotwise in the pSCH 4 at a temporal spacing $T_{s1}$. The signal packets 5 illustrated in FIG. 1 have a double-peak signal 6 from a first base station and a single-peak signal 7 from a second base station. The received signal packets 5 are subjected to slotwise accumulation 9 via a matched filter 8. After the data thus obtained has been processed via an indicator 10 and a peak detector 11, the information obtained therefrom is passed on to the evaluator 1. The latter then performs the accurate determination of the received frequency of the local oscillator in the mobile station 16 of the mobile communications device.

The cycle of an accurate determination of the frequency drift of the local oscillator, and thus of the calibration of the latter with the aid of a UMTS mobile radio network, is shown in FIG. 2. The frequency band covered by UMTS is 60 MHz wide and has enumerated channels. The center carrier frequency of the base station is approximately 2.1 GHz. The inband power, which has a bandwidth of approximately 3.84 MHz, is measured in a first iteration step by the power sensor 3 for the purpose of coarse determination of the transmit frequency of the base station. A coarse search is thereby placed ahead of the actual correlation. In conjunction with the a-priori knowledge of the channel raster, the results obtained fix the received channel frequencies, which stem from different base stations, as early as in the preselection from +/−200 kHz, since this corresponds exactly to the channel raster. As such, the received channels are determined in the 200 kHz raster by the power sensor 3. The maximum determined by the power sensor 3 is at approximately 10 MHz, this frequency already being reduced about the center carrier frequency of the base station. The step width can be 1 MHz because of the a-priori knowledge of the channel raster, it being possible to determine the channel frequency up to +/−200 kHz; that is to say, the power sensor 3 determines the received channels in the 200 kHz raster on which the base stations are transmitting. It is also possible to use a step width of over 1 MHz; however, it is preferred to use the lesser step width of 1 MHz when several base stations are transmitting.

The fine adjustment of the frequency of the local oscillator is performed via the pSCH correlator, which is specified according to the prescribed standard. The results of this correlator are used for the purpose of correcting frequency deviations of the local oscillator that exist because of manufacturing tolerances and temperature fluctuations.

On the basis of the channel raster thus found, it is possible to use a second iteration step to achieve the fine tuning of the oscillator drift via the pSCH oscillator with a substantially lower outlay. During the second iteration step, the received signal is compared with the pSCH sequence already known and uniform throughout the network. The pSCH correlator has a very narrow correlation bandwidth, or clear scanning result, which is, however, of very high power and obtained here only in conjunction with very low frequency detuning. The correlation bandwidth is 10-20 kHz, particularly approximately 16 kHz, and this can be obtained from simulation results. Other values also can result for the correlation bandwidth if the synchronization codes change during the standardization process.

Since the channel frequency is already determined up to +/−200 kHz, the exact frequency at which the base station is transmitting can be determined in few steps in a third iteration step with a step width below the correlation bandwidth; for example, 10 kHz here.

The third iteration step is, however, unnecessary when the a-priori knowledge about the channel raster is used, and the local oscillator (LO) of the mobile station has already been so well calibrated that it has a remaining inaccuracy of only +/−3 ppm; this corresponding to 6 kHz.

FIG. 4 shows a diagram in which, firstly, the inband power 12 illustrated in FIG. 3 and its maximum 13 are shown. Secondly, the output 14 of the pSCH correlator in the baseband is plotted below the inband power 12 of the power sensor 3. Here, as well, a correction was undertaken by the carrier frequency of the base station of approximately 2.1 GHz. The output 14 of the pSCH correlator has a correlation peak 15 at 10 MHz. The actual natural frequency of the local oscillator in the mobile station can be deduced from this result, since the channel raster with which the base station is transmitting is known a priori to the mobile station. In this case, the carrier frequency of the base station is precisely calibrated with an accuracy of 0.05 ppm. The deviation of the local oscillator of the mobile station 16 from the known reference frequency is determined by comparing the position found for the measured correlation peak 15 with the known channel frequency of the base station. The data for autocalibration are thereby obtained. The manufacturing tolerances in the natural frequency of the local oscillator of +/−25 ppm can be compensated to the extent that it is possible to assume a maximum deviation of +1-3 ppm for future synchronization operations. Future synchronization processes are thereby substantially accelerated.

If a first case of synchronization is involved, that is to say the device is being started up for the first time at the customer's, there is a maximum deviation of 50 ppm from the reference frequency. As such, the pSCH correlation can be performed, for example, in 50 steps of step width 1 ppm; that is to say, 2 kHz. After the first calibration has been performed, the maximum permissible deviation is then only 3 ppm. The pSCH correlation then requires only six steps given an identical step width of 2 kHz. As such, after initial synchronization has been performed, the automatic frequency acquisition described operates almost 10 times more quickly.

During the initial calibration of the local oscillator in the RF section of the mobile part 16, the algorithm can undertake settings for calibrating the local oscillator that otherwise would have had to be undertaken during the production process. Instead of undertaking the calibration during the production process, this is done automatically during the first startup of the device at the customer's. After the synchronization, the accurately determined frequency of the local oscillator is taken over as reference by storing the hardware calibration parameters.

Although the present invention has been described with reference to specific embodiments, those of skill in the art will recognize that changes may be made thereto without departing from the spirit and scope of the present invention as set forth in the hereafter appended claims.

The invention claimed is:

1. A method for frequency acquisition via a known synchronization sequence for synchronizing a mobile communications device having a local oscillator with previously known transmit frequencies of a base station that transmit in a known channel raster with defined frequency points within a band, the method comprising the steps of:

determining an inband power of a received carrier frequency via a power sensor by scanning a frequency band;

performing coarse determination of a local power maximum of the inband power at a coarse carrier frequency, and thus of the received carrier frequency over the scanned frequency band;

producing a presumed channel frequency at which the base station is transmitting based on the coarse carrier frequency and knowledge of the channel raster of the transmit frequencies of the base station, the presumed channel frequency being different than the coarse carrier frequency; and simultaneously performing fine determination of the received carrier frequency using a synchronization channel, the synchronization channel having a correlation peak at a frequency that is different than the presumed channel frequency and different than the coarse carrier frequency.

2. A method for frequency acquisition as claimed in claim 1, wherein the method is applied upon at least one of a first startup and each further startup of the mobile communications device.

3. A method for frequency acquisition as claimed in claim 1, the method further comprising the step of adopting an accurately determined frequency of the local oscillator as reference by storing the frequency in a memory of the mobile communications device.

4. A method for frequency acquisition as claimed in claim 1, wherein the method is applied in a Universal Mobile Telecommunications System (UMTS) mobile radio network, with the determination of the inband power being performed by a power sensor and the fine determination of the received carrier frequency being performed by an Synchronization Channel (SCH) correlator.

5. A method for frequency acquisition as claimed in claim 1, wherein the mobile communications device carries out a callup to the base station and a switch is made to a second base station during the call.

* * * * *